United States Patent [19]
Porter et al.

[11] 3,717,731
[45] Feb. 20, 1973

[54] ACCELERATION RESPONSIVE SENSOR

[75] Inventors: Glenn A. Porter, Greendale; Norman J. Roth, Hales Corners, both of Wis.

[73] Assignee: General Motors Corporation, Detroit, Mich.

[22] Filed: June 30, 1971

[21] Appl. No.: 158,170

[52] U.S. Cl. ...................................200/61.45 M
[51] Int. Cl. ............................................H01h 35/14
[58] Field of Search.....200/61.45 R, 61.45 M, 61.48, 200/61.49; 280/150 AB

[56] References Cited

UNITED STATES PATENTS

| | | | |
|---|---|---|---|
| 2,311,637 | 2/1943 | Buchanan | 200/61.49 |
| 2,850,291 | 9/1958 | Ziccardi | 200/61.51 X |
| 3,281,551 | 10/1966 | Becke | 200/61.45 R |
| 3,336,045 | 8/1967 | Kobori | 200/61 X |
| 3,410,359 | 11/1968 | Mollison | 180/103 |
| 3,639,710 | 2/1972 | Haruna et al. | 200/61.48 |
| 3,647,999 | 3/1972 | Mazelsky | 200/61.45 R |
| 3,556,556 | 1/1971 | Goetz | 200/61.45 X |
| 2,802,204 | 8/1957 | Kennelly et al. | 200/61.45 M |
| 3,619,524 | 11/1971 | Gillund | 200/61.45 M |

Primary Examiner—Herman J. Hohauser
Assistant Examiner—M. Ginsburg
Attorney—W. E. Finken et al.

[57] ABSTRACT

A sensor includes a vertical housing and a plastic base member secured thereto. The base member includes an upper wall having a sector shaped recess cooperatively defined by a pair of angular integral side walls joined by integral walls at their proximal and distal ends. The base member further includes an integral recess which mounts a pole magnet with its axis coplanar with a bisector of the recess. The upper end of a deflectable spring rod is insulated from the housing and located coaxial thereof. The lower end of the rod mounts a cylindrical mass which is attracted by the magnet into tangential engagement with the side walls of the recess adjacent their proximal ends to bend the lower portion of the deflectable rod out of coaxial relationship with the housing. A contact plate between the housing and base member includes a plurality of spring fingers which are cantilevered over the recess. The spring rod and housing are connected across a source of power and a mechanism to be actuated. A pulse of predetermined amplitude and time moves the mass against the magnetic attraction of the magnet into engagement with one or more of the spring fingers to close the circuit.

4 Claims, 4 Drawing Figures

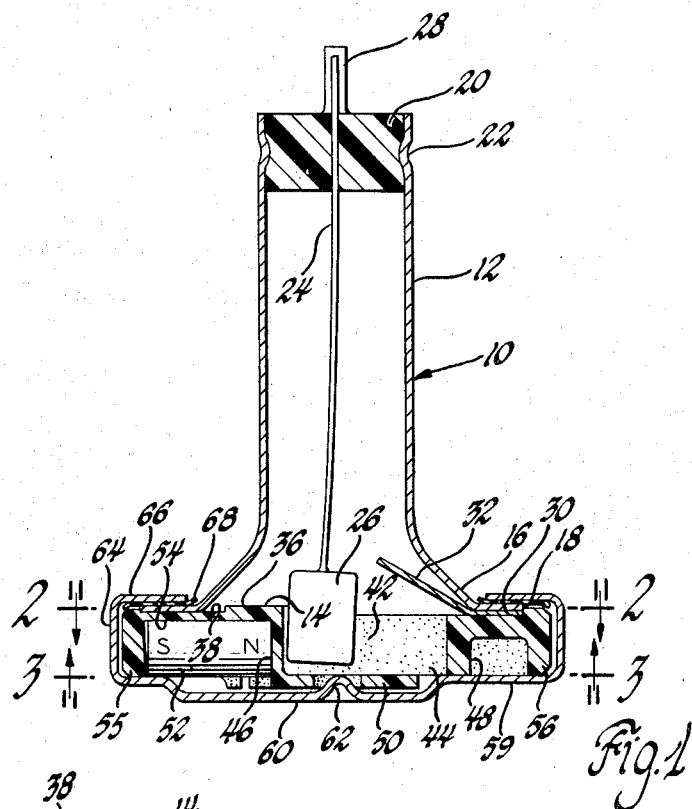

ACCELERATION RESPONSIVE SENSOR

This invention relates generally to sensors and more particularly to pendulum-type sensors wherein a mass supported on a deflectable member moves between normal and actuated positions when a pulse of predetermined amplitude and time is applied thereto.

The sensor of this invention is similar to that disclosed in copending application Ser. No. 158,171, Sensor, Glenn A. Porter, filed June 30, 1971, and assigned to the assignee of this invention, but differs therefrom in certain features.

One of the features of the sensor of this invention is that it includes a plastic base having integral walls which define a sector shaped recess within which a deflectable spring rod supported mass is movable between normal and actuated positions, and integral means for mounting a pole magnet which magnetically retains the mass in normal position. Another feature is that the spring rod supporting the mass is mounted coaxial of a tubular housing and is partially deflected out of such coaxial relationship when the mass is in normal position. A further feature is that a spring finger contact is deflectably engaged by the mass in actuated position and applies a noncolumnar load on the spring rod when so engaged. Yet another feature is that the spring finger contact is indexed to the housing and the housing is indexed in turn to the base before securement thereto. Yet a further feature is that the spring rod supporting the mass is electrically insulated from the housing and a source of power is electrically connected to such rod and to the spring finger contact through the housing.

These and other features of the sensor of this invention will be readily apparent from the following specification and drawings wherein:

FIG. 1 is a sectional view of a sensor according to this invention;

FIG. 2 is a view taken generally along the plane indicated by line 2—2 of FIG. 1;

FIG. 3 is a view taken generally along the plane indicated by line 3—3 of FIG. 1; and FIG. 4 is an enlarged view taken generally along the plane indicated by line 4—4 of FIG. 3.

Referring now to FIG. 1, a sensor 10 according to this invention includes a generally vertically extending tubular housing 12 and a circular base member 14 of plastic material. The lower end of housing 12 terminates in an outwardly flaring circular flange 16 which is provided with a flat 18. A plastic plug 20 is received within the upper open end of housing 12 and is secured thereto by deforming a bead 22 of the housing within an annular groove of such plug. A deflectable spring rod 24 extends through the plug 20 and is suitably secured thereto to locate the rod coaxial of the housing 12. The lower end of the rod supports and is suitably secured to a cylindrical mass 26 of predetermined weight. The end of the rod 24 upwardly of the plug and an axial tab 28 of the housing 12 are connected across a source of power and a mechanism to be actuated by the sensor 10.

As shown in FIGS. 1 and 2, a contact plate 30 includes a plurality of angularly extending cantilever spring fingers 32. The periphery of the contact plate is generated about the axis of housing 12 except for a flat 34 which indexes with the flat 18 of housing 12. The plate 30 is suitably secured to the flange 16 of the housing to ensure electrical connection therebetween.

The base member 14 includes an upper wall 36 provided with a shallow slightly stepped recess 38, the deeper portion of which partially receives the flange 16 and fully receives the contact plate 30, and the shallower portion of which partially receives only the flange 16. A flat 40 of such recess indexes to the flat 34 of the plate 30 and flat 18 of flange 16 to thereby index the housing 12 to the base member. A generally sector shaped recess 42 opens through the wall 36 and is defined by a pair of angularly related linear side walls 44, FIG. 3, which are integral with and extend normal to wall 36. Walls 44 are joined adjacent their proximal ends by an integral linear wall 46 and adjacent their distal ends by an integral circular wall 48 generated about the axis of housing 12. The spring fingers 32 extend angularly over the recess 42 from the arcuate end thereof. The lower opening of the recess 42 is partially closed by a lower apertured planar wall 50 formed integral with walls 44, 46, and 48.

An axial pole permanent magnet 52 is received within a semi-cylindrically shaped recess 54, FIGS. 1 and 4, of the base member 14 which is defined by wall 36, wall 46, and a recessed boss 55 of a peripheral wall 56 of the member 14. Deflectable integral tabs 58 extend downwardly from the wall 36 and grip the magnet 52 as shown in FIG. 4 to thereby retain the magnet in place on the base member 14.

A lower cover plate 59 seats on walls 48 and 56 and includes a circular embossment 60 receiving wall 50 and having a node 62 received within the aperture thereof. A lateral peripheral flange 64 of plate 59 surrounds wall 56 and merges into a flange 66 crimped over flange 16 to assemble the housing 12 and base member 14. A resilient washer 68 is provided between the flanges 16 and 66.

When the sensor is in normal position as shown in FIGS. 1 and 2, the mass 26 is magnetically attracted by the magnet 52 into tangential engagement with the walls 44 of recess 42 adjacent their proximal ends and adjacent wall 46. This deflects the lower portion of the rod 24 out of coaxial relationship with the housing 12. When an acceleration pulse of predetermined amplitude and time is applied in a horizontal plane to the mass 26 within its angular zone of response, the mass 26 moves to the right as viewed in FIG. 1 and towards the arcuate wall 48 to engage the upper peripheral edge thereof with one or more of the fingers 32 and close the circuit across the source of power and the mechanism to be actuated. The upper peripheral edge of the mass upwardly deflects the spring finger(s) engaged thereby so that the spring finger(s) in turn apply a downward force on such mass to in turn apply a columnar load on rod 24 in tension rather than in compression. This ensures the useful life of the spring rod. The arcuate wall 48 limits the extent of movement of the mass 26 under acceleration pulses and is engaged by the mass 26 before the mass permanently deforms any of the spring fingers 32 engaged thereby. In the particular embodiment shown, the walls 44 of recess 42 define an included angle of 74°. This angle is less than the zone of response, 120°, of the sensor 10 and is set in a predetermined manner as set forth in copending application Ser. No. 173,806, Sensor, Rodney A. Brooks and Vincent A. Orlando, filed Aug. 23, 1971, and assigned to the assignee of this invention.

The sensor disclosed herein is particularly intended for use in vehicle body occupant restraint systems to sense acceleration pulses applied to the body and to actuate a pressure fluid source for inflation of an occupant restraint cushion when a pulse of predetermined amplitude and time is sensed.

Thus, this invention provides an improved sensor.

We claim:

1. A sensor comprising, in combination, a tubular housing, an annular base member of dielectric material and including a generally planar wall having one side thereof facing one end of the housing and having a sector shaped recess therethrough opening to the housing and cooperatively defined by a pair of angularly diverging side walls joined at their distal ends by an arcuate end wall, the side walls and end wall being integral with the base member, means securing the base member to the housing, a contact member located between the one end of the housing and the planar wall and including at least one cantilever spring finger extending over the recess from the arcuate end wall thereof, a spring rod extending through the housing, means mounting the rod adjacent one end thereof to the housing adjacent the other end thereof and insulating the rod from the housing, a mass secured to the other end of the rod and electrically connected thereto, the mass having at least a portion thereof movable within the sector shaped recess, a pole magnet, and integral means mounting the magnet on the planar wall adjacent the proximal end of the recess and locating the axis of the magnet coplanar with a bisector of the recess, the magnet magnetically attracting the mass into engagement with the side walls of the recess adjacent the proximal ends thereof, an acceleration pulse of predetermined amplitude and time moving the mass toward the arcuate end wall of the recess and into wiping engagement with the spring finger to close a circuit across a source of power connected to the mass and spring finger.

2. A sensor comprising, in combination, a tubular housing, an annular base member of insulating material including a generally planar wall having one side thereof facing one end of the housing and having a sector shaped recess therethrough opening to the housing and cooperatively defined by a pair of angularly diverging integral side walls joined at their distal ends by an integral arcuate end wall, means indexing the housing and base member to each other, means securing the base member to the housing, a contact member indexed to the housing and located between the one end of the housing and the one side of the planar wall, the contact member including at least one cantilever spring finger extending angularly to the recess from the arcuate end wall thereof, a spring rod extending through the housing, insulating means mounting the rod adjacent one end thereof to the housing adjacent the other end thereof, a mass secured to the other end of the rod and having at least a portion thereof movable within the sector shaped recess, a pole magnet, and integral means on the base member mounting the magnet on the other side of the planar wall, the magnet axis being coplanar with a bisector of the recess, the magnet magnetically attracting the mass into engagement with the side walls of the recess adjacent the proximal ends thereof, an acceleration pulse of predetermined amplitude and time moving the mass toward the arcuate end wall of the recess and into wiping engagement with the spring finger to close a circuit across a source of power connected to the mass and spring finger.

3. A sensor comprising, in combination, a vertical tubular housing of conducting material, an annular base member of insulating material including a generally horizontal integral wall having the upper side thereof facing the lower end of the housing and having a sector shaped recess therethrough opening to the housing and cooperatively defined by a pair of angularly diverging integral side walls joined at their distal ends by an integral arcuate end wall, means securing the base member to the housing, a contact member electrically connected to the lower end of the housing and located therebetween and the upper side of the planar wall, the contact member including at least one cantilever spring finger extending angularly to the recess from the arcuate end wall thereof, a spring rod extending through the housing, means mounting the upper end of the rod to the upper end of the housing, a mass secured to the lower end of the rod and having at least a portion thereof movable within the sector shaped recess, a pole magnet, and integral means on the base member wall mounting the magnet on the lower side thereof, the magnet axis being coplanar with a bisector of the recess, the magnet magnetically attracting the mass into engagement with the side walls of the recess adjacent the proximal ends thereof, an acceleration pulse of predetermined amplitude and time moving the mass toward the arcuate end wall of the recess and into wiping engagement with the spring finger to close a circuit across a source of power connected to the mass through the rod and to the spring finger through the housing.

4. A sensor comprising, in combination, a vertical tubular housing, a circular base member including a generally horizontal upper wall having the upper side thereof seating the lower end of the housing and having a sector shaped recess therethrough opening to the housing and cooperatively defined by a pair of angularly diverging side walls joined at their distal ends by an arcuate end wall, means securing the base member to the housing, a contact member located between the lower end of the housing and the upper side of the planar wall and including at least one cantilever spring finger extending angularly to the recess from the arcuate end wall thereof, a spring rod extending through the housing, means coaxially mounting the upper end of the rod to the housing adjacent the upper end thereof, a cylindrical mass secured to the lower end of the rod and having at least a portion thereof movable within the sector shaped recess, a pole magnet, and means mounting the magnet on the lower side of the upper wall, the magnet axis being coplanar with a bisector of the recess, the magnet magnetically attracting the mass into engagement with the side walls of the recess adjacent the proximal ends thereof and deflecting at least the lower portion of the spring rod out of coaxial relationship to the housing, an acceleration pulse of predetermined amplitude and time moving the mass toward the arcuate end wall of the recess to move the upper peripheral edge thereof into wiping engagement with the spring finger to apply a columnar load in tension to the spring rod and close a circuit across a source of power connected to the mass and spring finger.

* * * * *